Dec. 17, 1940.   C. E. SMITH   2,224,936
HARDNESS TESTING MACHINE
Filed Dec. 13, 1937
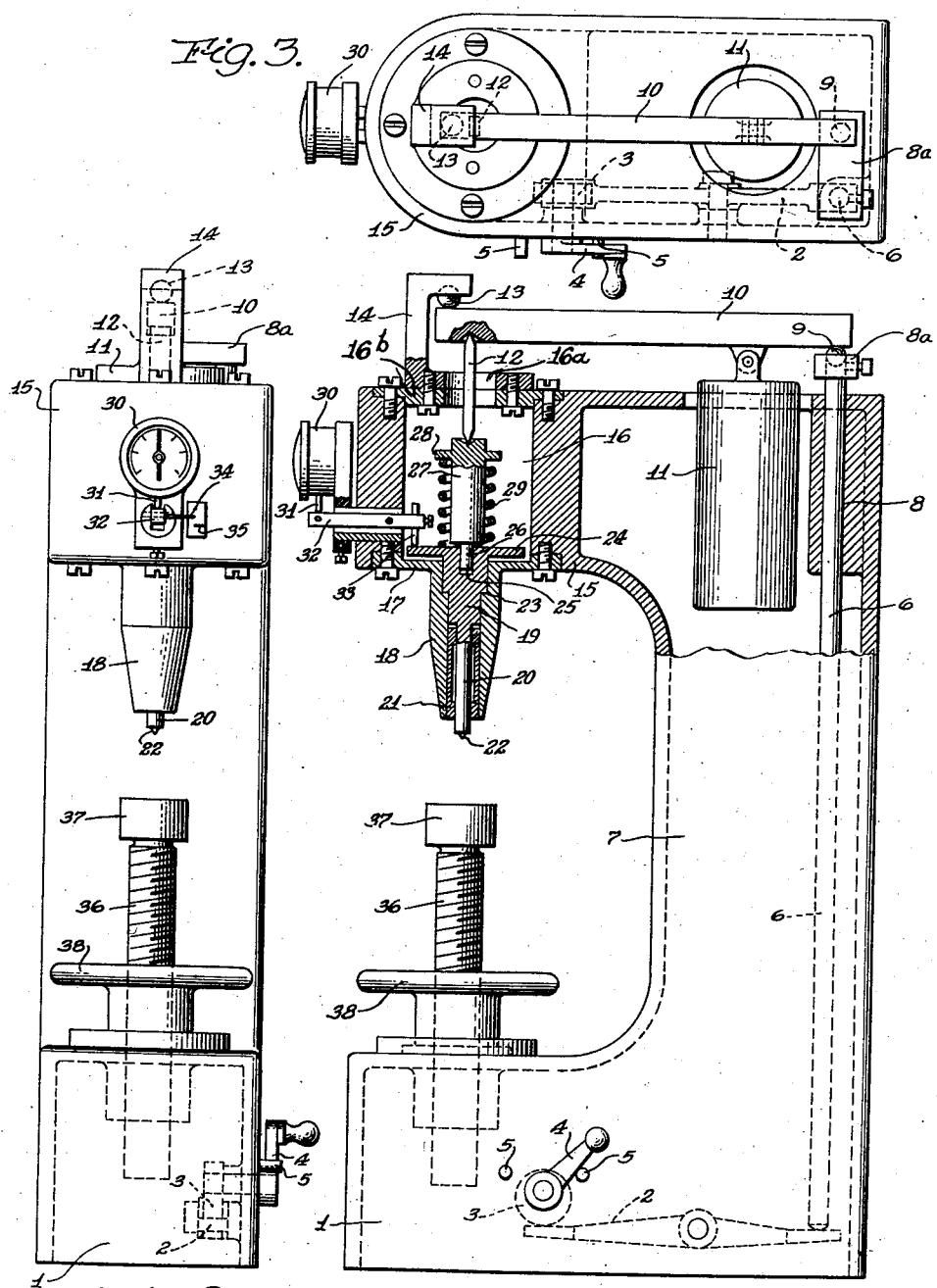
Inventor
Clarence E. Smith,
By
Attorneys Patented Dec. 17, 1940

2,224,936

UNITED STATES PATENT OFFICE 2,224,936

HARDNESS TESTING MACHINE

Clarence E. Smith, Dearborn, Mich., assignor to Pyro-Electro Instrument Co., Detroit, Mich., a corporation of Michigan Application December 13, 1937, Serial No. 179,422

2 Claims. (Cl. 265—12)

The present invention relates to means for testing and indicating the hardness of metal, and more particularly to a machine for this purpose wherein the hardness of the metal tested is determined by the depth of penetration of a test member under a given load.

In machines of this character where the full length of the penetrating stroke is effective in operating an indicator, the resulting indication is modified by including the initial part of the penetrating stroke or that part which penetrates the skin or surface layer of the metal, and an incorrect indication as to the hardness of the interior or body of the metal is therefore shown by the indicator. It is essential, therefore, that this initial part of the penetration of the penetrating member be ineffective to operate the indicator and the primary object of the present invention is to provide, in a machine of this character, a mechanism whereby the initial penetration of the penetrating member is eliminated as a factor of the indication by the indicator.

When the penetrating member of a hardness testing machine is loaded it functions to cause a permanent deformation in the metal and also a temporary distortion of said deformation because of the inherent resiliency of the metal. The depth of the deformation indicates the hardness of the metal and if that depth is measured while the penetrator is under a load the temporary distortion of the metal due to such loading modifies the indication. It is, therefore, another object of the invention to provide, in a machine of this character, a mechanism whereby the temporary distortion of the metal due to the application of a load thereon is eliminated as a factor of the indication by the indicator.

Another object of the invention is to provide a machine of this character embodying a penetrator, means for gradually applying a load on the penetrator to cause it to penetrate the metal to be tested, and means for measuring the depth of the deformation caused by penetration of the penetrator after the load which caused such penetration has been removed from the penetrator.

With the above and other ends in view, the invention is more fully disclosed with reference to the accompanying drawing in which Figure 1 is a side view, partly in elevation and partly in section;

Fig. 2 is a front elevation, and

Fig. 3 is a top plan.

Like characters of reference are employed throughout the drawing and description to indicate corresponding parts.

The present machine comprises a base 1 within which is mounted a rocking lever 2 and a cam 3, adapted to be manually operated by a hand piece 4, engages one end of the lever whereby the latter may be manually rocked. Stops 5 are mounted on the base for restricting movement of the hand piece to thereby restrict movement of the cam and lever. A vertical push rod 6 has its lower end resting upon the other end of the rocking lever 2, the push rod 6 being guided within the standard 7, which rises from the base 1, by a bearing 8 disposed at the top of the standard 7. The upper end of the push rod 6 has a head 8a removably secured thereon and carrying a hardened ball 9 which engages the lower side of a beam 10 adjacent one end thereof. A weight 11 is pivotally attached to the beam 10 adjacent to the rod 6.

The opposite end of the beam 10 is supported upon the knife-edge bearing at the upper end of a bar 12, at its lower side, and its upper side engages a hardened ball 13 carried by a fixed bracket 14 having an opening 16a in its base registering with the like opening in a plate 16b both secured to the overhanging arm 15 on the standard 7. The arm 15, which supports the bracket 14, has a bore 16 extending vertically therethrough and within the lower edge of which is removably secured a plate 17 carrying a guide 18 having an axial bore receiving a plunger 19. The stem portion 20 of the plunger is supported in an anti-friction bearing 21, and the lower end of the stem 20 projects from the lower end of the guide 18 and carries a penetrator 22. The guide 18 and the plunger 19 have cooperating shoulders 23 which support the plunger 19 against downward movement as a result of gravity acting upon the plunger.

The upper end of the plunger 19 has a disk 24 formed thereon and disposed within the bore 16, and having an axial bearing 25 receiving a stem 26 on an auxiliary plunger 27. The auxiliary plunger 27 is engaged by the knife-edge bearing at the lower end of the bar 12 and constitutes the support for said bar and the beam 10 which rests thereon. The auxiliary plunger 27 has a flange 28 adjacent its upper end and a coiled spring 29 is interposed between the flange and the plunger 19 and normally tends to separate the two plungers as shown in Fig. 1.

An indicator 30 is mounted on the end of the arm 15 and has its actuator 31 connected to a lever 32, pivotally mounted in the arm 15, and carrying an adjustable pin 33 which engages the disk 24. The lever 32 also carries a pointer 34 which cooperates with a mark 35 on the arm 15 in a manner hereinafter described.

In the base 1 is mounted a screw 36, carrying a work support 37, and adapted to be adjusted vertically by a hand wheel 38. In operation, the metal to be tested is placed upon the support 37 and is moved vertically until it engages the penetrator 22. After engaging the penetrator movement of the work is continued and it elevates the plunger 19 until the clearance between the two plungers is taken up, due to the fact that the auxiliary plunger is held stationary by the beam 10 and weight 11. As the plunger 19 moves vertically in this manner the disk 24 rocks the lever 32 and, of course, actuates the indicator 30. The clearance between the two plungers ordinarily amounts to approximately thirty thousandths of an inch and the indicator pointer ordinarily would be caused to make more than one complete movement as a result of such an amount of movement of the plunger, and the fact that the indicator pointer indicated zero would not necessarily mean that the clearance had been taken up. However, when the pointer 34 coincides with the mark 35 and the indicator pointer is at zero the operator is informed that the clearance between the two plungers has been taken up and that any further relative movement between the plunger and the work would cause the penetrator to deform the work.

The pressure exerted by the plunger and penetrator on the work is equal to the pressure of the spring 29, and the spring 29 exerts a pressure sufficient to cause penetration of the skin or surface layer of the metal being tested. Thus, in the condition reached at this stage, the skin or surface layer is penetrated, the indicator pointer is at zero, and any downward movement of the plungers 19 and 27 will cause deformation of the metal being tested.

With the mechanism, positioned as above described, the cam 3 is manually operated to permit rocking movement of the lever 2 and lowering of the push rod 6. The weight 11 then acts to urge the beam 10 downwardly, thus pressing the bar 12, auxiliary plunger 27 and plunger 19 downwardly whereby the penetrator 22 deforms the test piece. The load is thus gradually applied to the penetrator due to progressive lowering of the beam as the cam 3 is manually moved rotatively, and after the full force of the loaded beam has been applied against the penetrator, the cam 3 is again actuated to rock the lever 2 whereby it moves the rod 6 upwardly and elevates the beam to the position shown in Fig. 2. The spring 29 functions at this time to hold the penetrator in contact with the work, and the position of the indicator pointer while the penetrator is yieldingly held in contact with the test piece indicates the hardness of the test piece.

The position of the indicator pointer when the penetrator is yieldingly held in contact with the test piece invariably is different from the position of the indicator pointer when the penetrator is under full load, due to the fact that the load not only deforms the metal but also distorts it. When under pressure of the spring, the metal is deformed but not in the condition of temporary distortion, and this distortion therefore does not render the penetration indication incorrect. In certain types of machines, the temporary distortion may not be sufficient to be of importance, but in a machine of the present type it is important because the deformation caused by the penetrator is very small. The depth of penetration rarely exceeds one thousandth of an inch, and with such a small amount of penetration it is essential that the natural-resiliency of the metal tested be eliminated as a factor in the penetration indication.

Although a specific embodiment of the invention has been illustrated and described it will be understood that various changes may be made within the scope of the appended claims without departing from the spirit of the invention, and such changes are contemplated.

What I claim is:

1. In a hardness testing machine, a support having a horizontal portion provided with an opening vertically therethrough, a guide member carried by said support and having a plate portion secured to the underside of said horizontal portion and underlying said opening, a vertically movable penetrator member slidably received and guided in said guide member, a connecting member within said opening and connected to said penetrator, a bracket on and provided with an opening in alignment with the opening in said horizontal portion and overlying said opening, a lever pivoted on said bracket, a pin of smaller diameter than the bracket opening and loosely extending through said opening and having knife edge engagement at its opposite ends with said connecting member and said lever, means for holding the pin in engagement with said connecting member and said lever, a weight on said lever to exert a force on said penetrator, and means operable to release said weight.

2. In a hardness testing machine, a support having a horizontal portion provided with an opening substantially vertically therethrough, a guide member carried by said support and having a plate portion secured to the underside of said horizontal portion and underlying said opening, a vertically movable penetrator member slidably received and guided in said guide member, a connecting member within said opening slidably mounted on said penetrator, a lost motion connection between said connecting member and said penetrator member, a plate mounted on said horizontal portion and overlying said opening, a bracket mounted on said plate, a lever pivoted on said bracket, the plate and bracket being provided with aligned openings, a pin of smaller diameter than said openings and having pointed ends engaging respectively in sockets in said connecting member and in said lever, spring means urging said connecting member upwardly and being the sole means of holding said pin in its sockets, a weight on said lever to exert a force on said penetrator through said pin and said connecting member, said pin being free to cant, and means operable to release said weight.

CLARENCE E. SMITH.